United States Patent [19]

Wakui

[11] Patent Number: 5,478,043
[45] Date of Patent: Dec. 26, 1995

[54] CONTROL APPARATUS FOR VERTICAL VIBRATION ELIMINATION TABLE

[75] Inventor: Shinji Wakui, Kawasaki, Japan

[73] Assignee: Canon Kabushiki Kaisha, Tokyo, Japan

[21] Appl. No.: 257,527

[22] Filed: Jun. 9, 1994

[30] Foreign Application Priority Data

Jun. 24, 1993 [JP] Japan ........................... 5-175957

[51] Int. Cl.$^6$ .................................................. F16M 13/00
[52] U.S. Cl. ......................... 248/550; 108/136; 188/378
[58] Field of Search .................................. 248/550, 638, 248/636, 562; 188/378, 267; 108/136; 318/649

[56] References Cited

U.S. PATENT DOCUMENTS

| | | | |
|---|---|---|---|
| 4,483,425 | 11/1984 | Newman | 188/378 |
| 4,730,541 | 3/1988 | Greene | 248/550 X |
| 5,060,519 | 10/1991 | Chojitani | 248/550 X |
| 5,251,863 | 10/1993 | Gossman | 248/638 X |
| 5,285,995 | 2/1994 | Gonzalez | 248/562 X |
| 5,327,061 | 7/1994 | Gullapalli | 318/649 |
| 5,356,110 | 10/1994 | Eddy | 108/136 X |
| 5,374,025 | 12/1994 | Whelpley | 188/378 X |
| 5,379,980 | 1/1995 | Houghton | 248/638 X |
| 5,385,217 | 1/1995 | Watanabe | 188/267 |

FOREIGN PATENT DOCUMENTS 328910  2/1991  Japan .

*Primary Examiner*—J. Franklin Foss
*Attorney, Agent, or Firm*—Fitzpatrick, Cella, Harper & Scinto

[57] ABSTRACT

A vertical vibration elimination table apparatus has a vibration elimination table supported by actuators at four portions thereof. The actuators are operable in response to signals which are fed back thereto and which are indicative of vertical positions and vertical accelerations of the four portions of the table. A control apparatus for controlling and driving the actuators includes a 4-degree-of-freedom motion mode extraction circuit for extracting motion mode error signals of four degrees of freedom including one degree of freedom for translational motion, two degrees of freedom for rotations and one degree of freedom for twist motion, a compensation circuit for producing compensated motion mode signals by effecting compensations on the respective motion mode error signals, and a motion mode distribution circuit for producing drive signals based on the compensated motion signals and delivering the drive signals to the respective actuators.

11 Claims, 4 Drawing Sheets

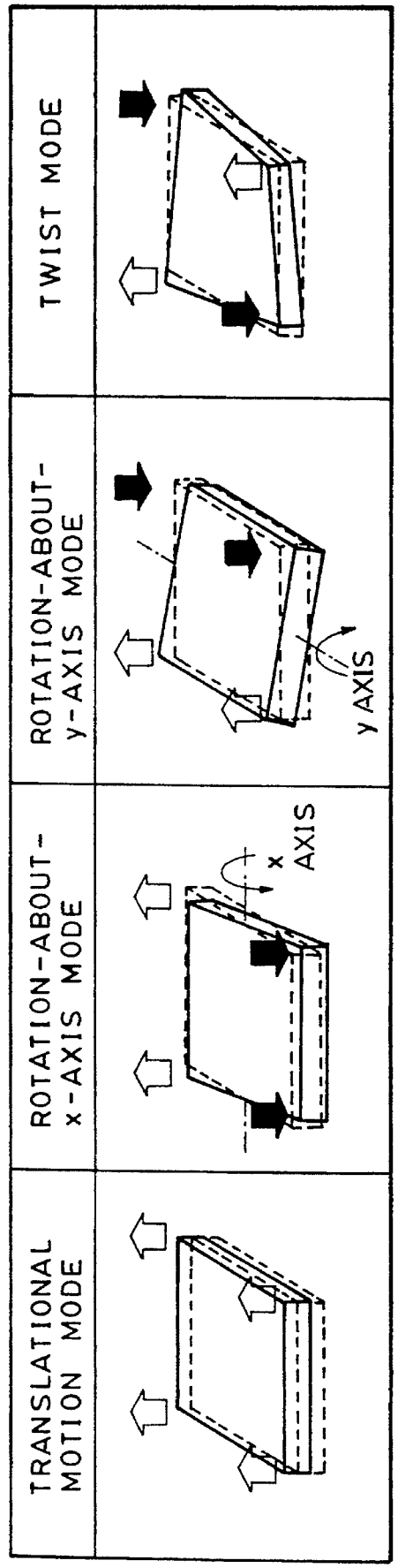

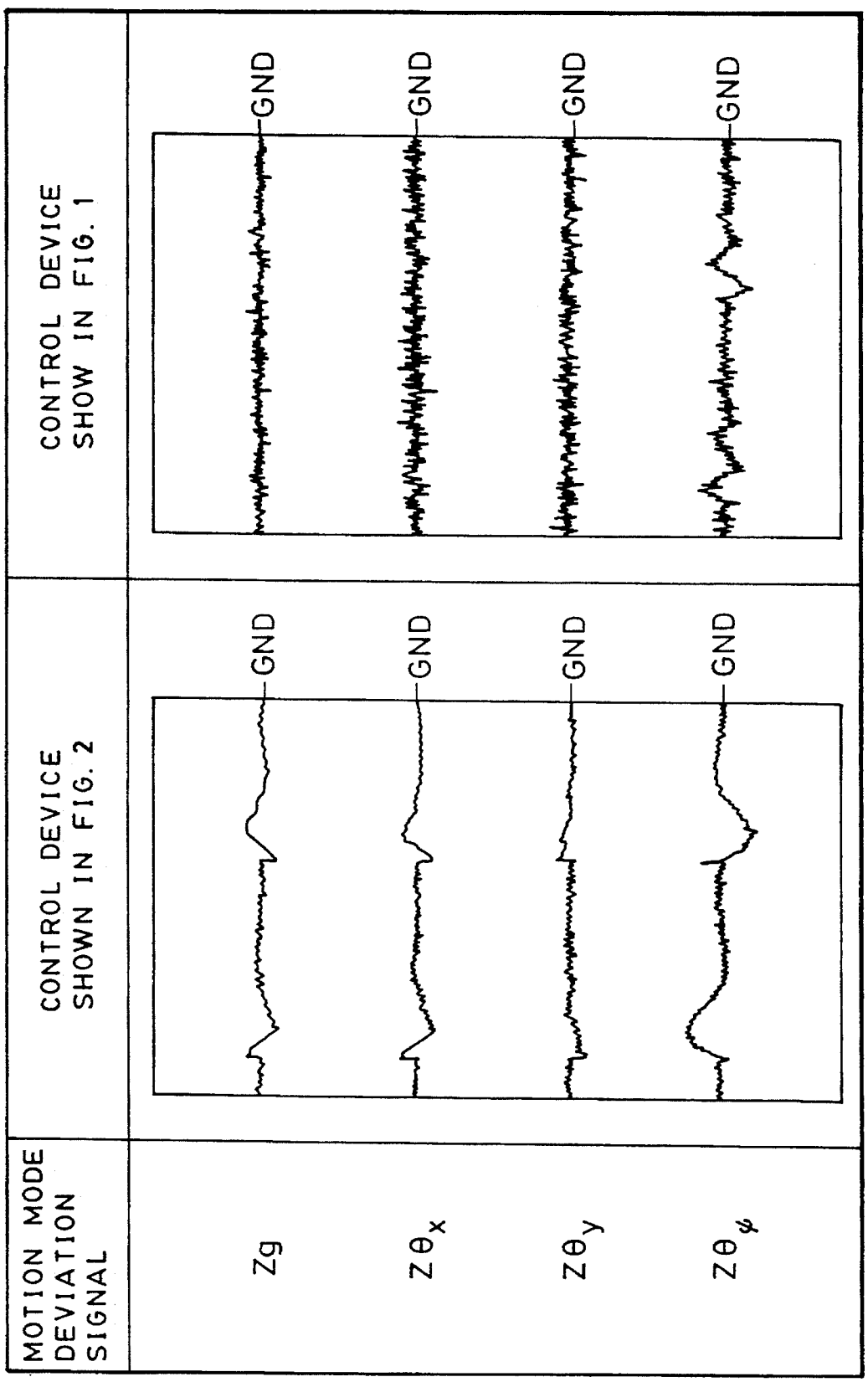

5,478,043

CONTROL APPARATUS FOR VERTICAL VIBRATION ELIMINATION TABLE

BACKGROUND OF THE INVENTION

1. Field of the Invention

The present invention relates to a control apparatus for controlling a vertical vibration elimination table which is used as a component in a semiconductor production unit and which is of the type having four supporting leg structures. More particularly, the present invention relates to a vertical vibration eliminator control apparatus which effectively performs control of motion of four degrees of freedom: three degrees of freedom in a rigid motion mode including one degree of freedom for translational motion and two for rotational motion, plus one degree of freedom for flexible motion.

2. Description of the Related Art:

In general, a pneumatic vibration elimination table carries apparatuses or instruments which are to be kept isolated from vibration. An example of such an apparatus is an exposure XY-stage which is used in the production of semiconductors. In order to achieve precise and quick exposure, the X-Y stage has to be used on a vibration elimination table which is free as much as possible from vibration. This is because the exposure has to be conducted while the exposure X-Y stage is completely still. The operation of the X-Y stage essentially includes intermittent motion of step and repeat. Thus, the X-Y stage itself constitutes a source of vibration as it generates vibration during a repeated step operation to vibrate the vibration elimination table. Exposure operation cannot be commenced until the vibration caused by the X-Y stage remains in the vibration elimination table. Thus, the vibration elimination table is required to have such characteristics that provide good balance between isolation from external vibration and damping of vibration forcibly caused on the table by, for example, an X-Y stage.

As well known in the field, a control apparatus for a pneumatic vibration elimination table employs an active feedback control in which the table is driven in such a manner as to cancel detected displacement of the vibration elimination table caused by vibration. FIG. 2 is a block diagram of a conventional control apparatus for a pneumatic vertical vibration elimination table of a type in which vertical position control of a vibration elimination table 8 is effected by means of four pneumatic leg structures. The pneumatic supporting leg structures are arranged at four corners of the vibration elimination table 8. Referring to FIG. 2, there are shown a servo valve 1a which controls supply discharge of air as the working medium to and from a pneumatic spring 2a, a position sensor 3a for measuring vertical displacement of a pedestal 4a, an acceleration sensor 5a for measuring vertical acceleration of the pedestal 4a, a pre-loading mechanical spring 6a and a viscous element 1a which inclusively represents the viscosity of the entire mechanism including the pneumatic spring, mechanical spring and other elements which are not shown. The mechanism constituted by the components or elements 1a to 7a is collectively referred to as a pneumatic spring supporting structure. As shown in this Figure, four pneumatic spring supporting leg structures are used to vertically support the vibration elimination table 8. Suffix symbols "a", "b", "c" and "d" are attached to numerals indicating the elements or components for the purpose of discrimination.

A description will now be given of the construction and operation of a feedback apparatus 15a for the pneumatic spring supporting leg structure having the components 1a to 7a. Output from the acceleration sensor 5a is negative feedback, fed through a low-pass filter 9a having a moderate amplitude and time constant, to the primary side of a voltage-current converter 10a which is used for operating the servo valve 1a. This acceleration feedback loop serves to stabilize the operation of the entire mechanism and produces a damping effect. The output from the position sensor 3a is input to a comparator circuit 12a trough a displacement amplifier 11a so as to be compared with a command voltage 13a which is equivalent to a command position of the pedestal 4a relative to the ground level, and the difference is output as a position error signal $e_a$. This position error signal $e_a$ is supplied through a PI compensator 14a to excite a voltage current converter 10a. Consequently, the servo valve 1a is opened and closed in accordance with the position error signal, so that the pressure inside the pneumatic spring 2a is correspondingly adjusted so as to hold the pedestal at the command position with zero steady-state error P and I respectively indicate proportional and integrating operations. The other three pneumatic spring supporting leg structures are controlled by feedback systems 15b, 15c and 15d similar to the feedback system 15a described above.

As stated before, the vibration elimination table carries instruments or apparatuses which are to be kept as much as possible from vibration. The vibration elimination table 8 therefore must be constructed to have high rigidity. Such a rigid construction causes the weight of the whole system including the vibration elimination table 8 and instruments and apparatuses carried by the table to be increased tremendously. In addition, transportation and installation of the vibration elimination table is dangerous and requires great care because the table including the associated control apparatuses is large and heavy and because the table is designed and constructed delicately to carry various types of precision equipment. Consequently, a specific transportation facility is required for the purpose of transportation of the vibration elimination table. It is also necessary that the construction of the site where the vibration elimination table and associated apparatuses are to be situated has a high level of rigidity and strength to bear the large weight. More specifically, a house having a floor with a large load carrying capacity is required for accommodating the vibration elimination table.

Thus, the rigid construction of the vibration elimination table 8 not only raises the cost of the table 8 itself but also incurs increased overall costs inclusive of the costs for transportation, installation and building of the accommodation facility such as a house.

Japanese Unexamined Patent Publication No. 3-28910 discloses a control method for a pneumatic vibration elimination table which uses a state feedback control. The state feedback method, however, too strongly relies upon physical parameters of the controlled object, so that this technique cannot suitably be used in practical commercial or industrial systems.

SUMMARY OF THE INVENTION

In view of the above-described problems of the known arts, the present invention is directed to an improvement in a control apparatus of the type which independently has a feedback system including a minor loop for acceleration and a loop containing compensation for position error. These features make this type of control apparatus adaptable to both practical and industrial uses.

More specifically, an object of the present invention is to provide a control apparatus for a vertical vibration elimination table which can be safely and easily handled and which can be produced and installed at reduced costs.

In accordance with one aspect of the invention, a control apparatus for controlling a vertical vibration elimination table comprises four supporting leg structures arranged at four corners of the vibration elimination table, with each supporting leg structure including a position sensor for producing a position signal indicative of a vertical position of the vibration elimination table, an acceleration sensor for producing an acceleration signal indicative of the vertical acceleration of the vibration elimination table and an actuator for vertically supporting the vibration elimination table. A feedback system receives the position signals and the acceleration signals and feeds back the position signals to form drive signals for driving the actuators and feeds back the acceleration signals to the drive signals. The feedback system comprises a 4-degree-of-freedom motion mode extraction circuit which extracts motion mode error signals of motion modes for four degrees of freedom of the table, including one degree of freedom for translational motion, two degrees of freedom for rotational motion and one degree of freedom for twist motion, based upon error signals determined as deviations of the position signals produced by the position sensors and corresponding reference position signals. Compensation means produces compensated motion mode signals by compensating the respective motion mode error signals such that each motion mode error signal is compensated independently of other motion mode error signals, and a motion mode distribution circuit produces drive signals corresponding to the respective actuators based on the compensated motion mode signals and delivers the driving signals to the respective actuators.

In accordance with another aspect of the invention, a control apparatus controls a vertical vibration elimination table apparatus supported by actuators at four portions thereof. The actuators are operable in response to signals which are fed back thereto and which are indicative of vertical positions and vertical accelerations of the four portions of the table. The control apparatus comprises a 4-degree-of-freedom motion mode extraction circuit for extracting motion mode error signals of four degrees of freedom of the table, including one degree of freedom for translational motion, two degrees of freedom for rotational motion and one degree of freedom for twist motion. Compensation means produces compensated motion mode signals by compensating the respective motion mode error signals such that each motion mode error signal is compensated independently of the other motion mode error signals, and motion mode distribution circuit means produces drive signals based on the compensated motion signals and delivers the drive signals to the respective actuators. In addition, control means drives the actuators based on the drive signals supplied by the motion mode extraction circuit.

In accordance with yet another aspect of the invention, a vibration elimination apparatus comprises a base and a plurality of actuator units supporting the base at different positions. Each actuator unit includes an actuator for moving the base, a position sensor for measuring the position of the base and an acceleration sensor for measuring the acceleration of the base. In addition, control means controls the actuators based on outputs of the position sensors and the acceleration sensors. The control means includes a motion mode extraction circuit which extracts, based on deviations of the outputs from the respective position sensors from corresponding different positions, error signals of motion modes of four degrees of freedom of the base, including one degree of freedom for translational motion, two degrees of freedom for rotational motion and one degree of freedom for twist motion. The control means controls the actuators based on independent motion mode error signals.

In operation, when the vibration elimination table is deviated from the reference position, actuators are driven in accordance with drive signals based on the error signals, so that the table is reset to the reference position. In this operation, error signals of various motion modes of one degree of freedom for translational motion, two degrees of freedom for rotations and one degree of freedom for twist motion, are extracted from the error signals. Compensation is adequately effected on the error signal for each of the motion modes. Compensated error signals are again distributed to driving components for the respective actuators. Thus, compensation is effected also on twist motion of the vibration elimination table so that an effective vibration elimination is achieved. Thus, the requirement for high rigidity of the table structure is less strict. Any twist motion in vibration mode, which may occur due to lack of rigidity, is effectively eliminated. Any structure has an aspect of being flexible from the view point of high-frequency vibration, however it may be rigid. Therefore, the invention also can be applied to existing rigid vibration elimination tables so as to further improve the accuracy of the posture control.

The above and other objects, features and advantages of the present invention will become clear from the following description when the same is read in conjunction with the accompanying drawings.

BRIEF DESCRIPTION OF THE DRAWINGS

FIGS. 3(a)–3(d) are illustrations of motion modes of a vibration elimination table; and FIG. 4 is a waveform chart illustrative of convergence of a motion mode error signal as obtained when a stepped twist is applied as a disturbance to the pneumatic vertical vibration elimination tables of FIGS. 1 and 2.

DESCRIPTION OF THE PREFERRED EMBODIMENTS

A preferred embodiment of the present invention will be described with reference to the accompanying drawings.

Figure 1:
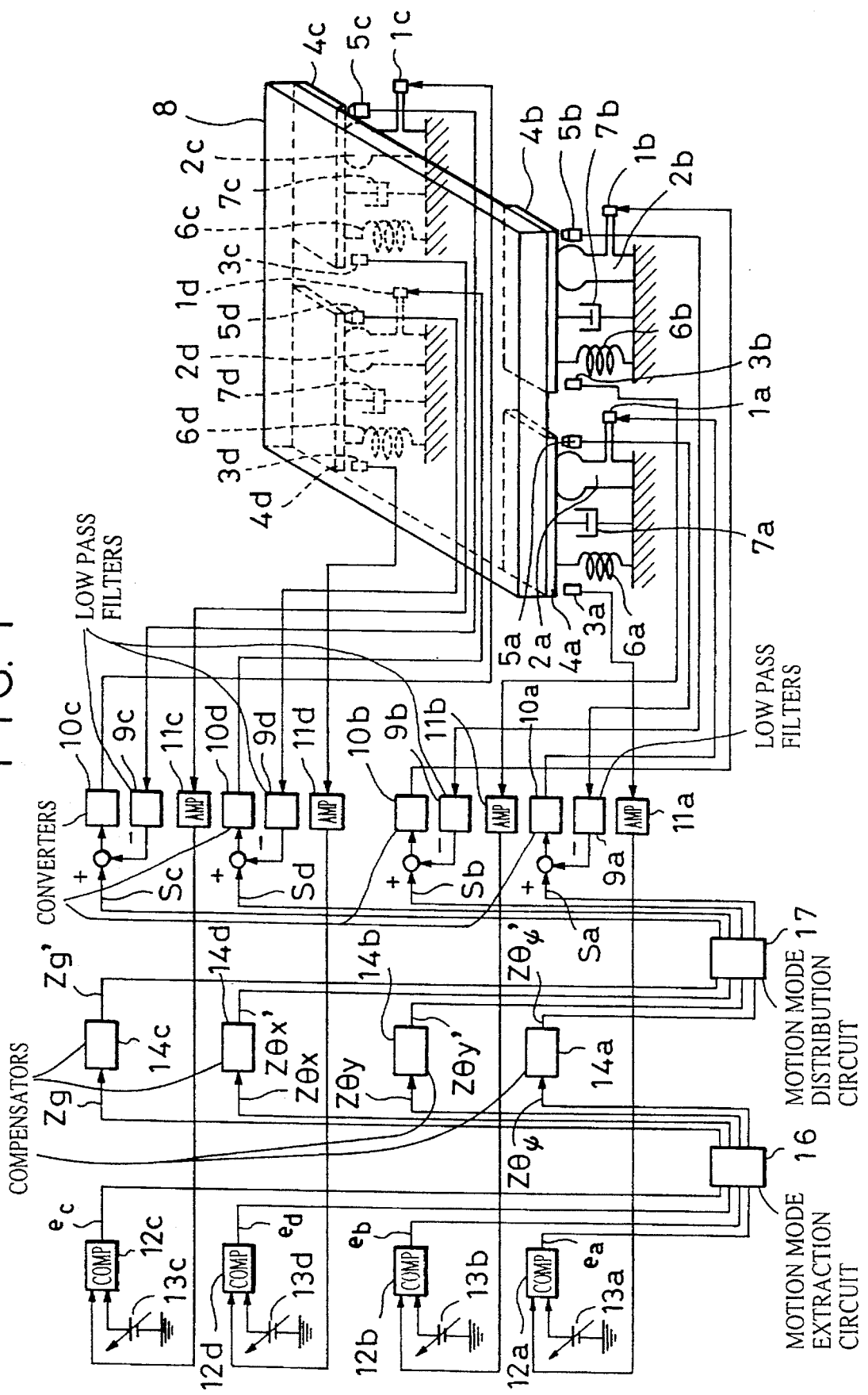
FIG. 1 is a block diagram of an embodiment of a control apparatus for a pneumatic vertical vibration elimination table in accordance with the present invention.

FIG. 1 is a block diagram illustrative of the construction of an embodiment of the pneumatic vertical vibration elimination table.

Figure 2:
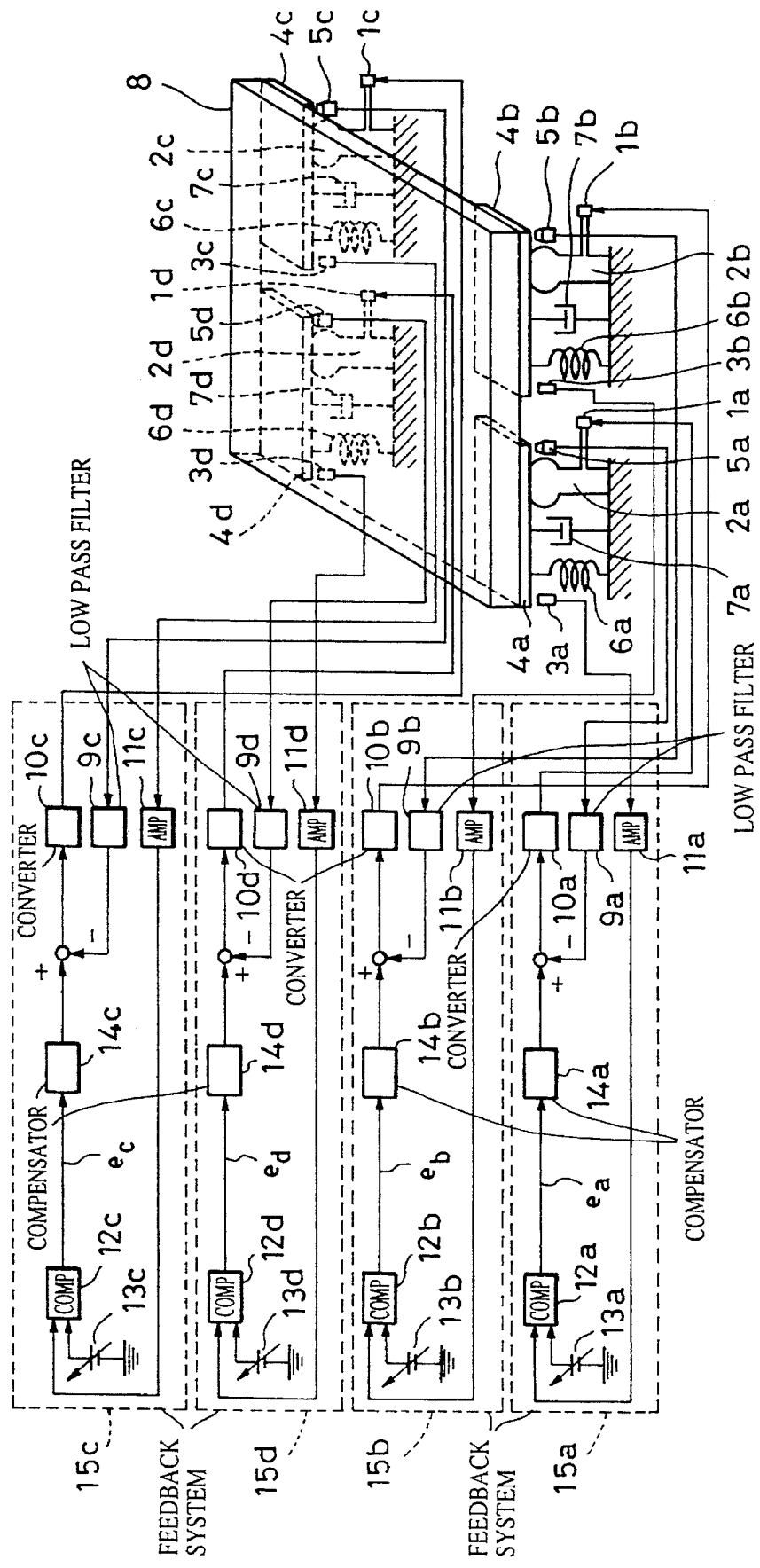
FIG. 2 is a block diagram of a known control apparatus for a pneumatic vertical vibration elimination table.

Each of the elements shown in block outline in FIG. 1, as well as in FIG. 2, is well known per se, and a specific type of construction is not critical to carrying out the invention or to the disclosure of the best mode for carrying out the invention. As will be seen from this Figure, a control apparatus for a pneumatic vertical vibration elimination table has four pneumatic supporting leg structures arranged at four corners of a tabular vibration elimination table 8 and a feedback system for locating the table 8 at a command vertical position without steady-state error. The feedback system comprises a 4 degree of freedom motion modes extracting circuit 16 which is connected between comparator circuits 12a to 12d and PI compensators 14a to 14d. The circuit 16 extracts, upon receipt of position error signals $[e_a, e_b, e_c, e_d]^T$ from respective pneumatic supporting leg structures, motion mode error signals $[z_g, z\theta_x, z\theta_y, z\theta\phi]^T$ including three kinds of rigid motion modes (one degree of freedom for translational movement and two degrees of freedom for rotations) and one kind of flexible motion mode (one degree of freedom for twisting). The feedback system also comprises a motion mode distribution circuit 17 which is connected between the PI compensators 14a to 14d and voltage-current converters 10a to 10d corresponding to servo valves 1a to 1d. The motion mode distribution circuit 17 performs a computation using motion mode compensation signals $[z_g', z\theta_x', z\theta_y', z\theta\phi']^T$ so as to produce drive signals $[S_a, S_b, S_c, S_d]^T$ and distributes these drive signals to the actuators of the four supporting leg structures. The superscript suffix T indicates transposition. The sums of the drive signals $[S_a, S_b, S_c, S_d]^T$ and the negative feedback signals through low-pass filters 9a to 9d are supplied to voltage current converters 10a to 10d. Other portions are materially the same as those of the known apparatus described before in connection with FIG. 2.

According to this arrangement, it is possible to detect four types of motion modes assessed by the vibration elimination table 8, through the computation which is performed by the motion mode extraction circuit 16 based on the signals output from the comparator circuits 12a to 12d.

These four types of motion modes are: (a) translational motion mode in which to whole vibration elimination table 8 is evenly displaced in a vertical direction, (b) rotation-about-X-axis mode in which the Whole table 8 rotates about an X-axis, (c) rotation-about-Y-axis mode in which the whole table 8 rotates about a Y-axis, and (d) twist mode, as shown in FIG. 3. The motion of three degrees of freedom presented as the motion modes (a), (b) and (c) is a rigid motion mode which is not accompanied by deformation of the vibration elimination table 8, while the twist mode (d) is a flexible motion mode which is attributable to the fact that the vibration elimination table 8 is not perfectly rigid, i.e., it has a certain degree of flexibility.

The motion mode error signals $[z_g, z\theta_x, z\theta_y, z\theta f]^T$ which are output from the motion mode extraction circuits 16 are delivered to the respective PI compensators 14a to 14d. In contrast, in the conventional control apparatus shown in FIG. 2, the PI compensators 14a to 14d receive local position error signals $[e_a, e_b, e_c, e_d]^T$ of the respective pneumatic supporting leg structures. Each of these position error signals includes all motion components concerning the motion of the vibration elimination table 8, i.e., translational motion, rotations and twist, so that the output signal from each of the PI compensators 14a to 14d contain various motion components. In contrast, the embodiment of the invention shown in FIG. 1, each of the PI compensators 14a to 14d perform compensation of only one motion component. More specifically, the PI compensator 14a conducts compensation of the translational motion component alone. Similarly, the PI compensators 14b, 14c and 14d conduct compensations of the about-X-axis rotation motion, about-Y-axis rotation motion and twist motion component, respectively.

The motion mode compensation signals $[z_g', z\theta_x', z\theta_y', z\theta\phi']^T$ output from the PI compensators 14a to 14d of FIG. 1 are delivered to the motion mode distribution circuit 17, and the outputs $[S_a, S_b, S_c, S_d]^T$ from the motion mode distribution circuit are used as signals which activate the respective pneumatic supporting leg structures arranged at four corners of the vibration elimination table 8. Namely, the motion mode compensation signals $[z_g', z\theta_x', z\theta_y', z\theta\phi']^T$ corresponding to translational, rotational and twist motion components are made to pass through the motion mode distribution circuit 17 so as to be transformed again into the signals corresponding to the drive of the respective pneumatic supporting leg structures arranged at the four corners of the vibration elimination table 8.

The computation performed by the motion mode distribution circuit is represented by the following formula (1), while the computation performed by the motion mode extraction circuit 16 is represented by the following formula (2). These computations can easily be realized by using an operation amplifiers and resistors.

$$\begin{bmatrix} s_a \\ s_b \\ s_c \\ s_d \end{bmatrix} = \begin{bmatrix} 1 & -1 & 1 & -1 \\ 1 & -1 & -1 & 1 \\ 1 & 1 & -1 & -1 \\ 1 & 1 & 1 & 1 \end{bmatrix} \begin{bmatrix} z_g \\ z\theta_x \\ z\theta_y \\ z\theta_\phi \end{bmatrix} \quad (1)$$

$$\begin{bmatrix} z_g \\ z\theta_x \\ z\theta_y \\ z\theta_\phi \end{bmatrix} = \frac{1}{4} \begin{bmatrix} 1 & 1 & 1 & 1 \\ -1 & -1 & 1 & 1 \\ 1 & -1 & -1 & 1 \\ -1 & 1 & -1 & 1 \end{bmatrix} \begin{bmatrix} e_a \\ e_b \\ e_c \\ e_d \end{bmatrix} \quad (2)$$

The superiority of the control apparatus of the embodiment shown in FIG. 1 over the known apparatus shown in FIG. 2 will be demonstrated by comparing operation performances of both apparatuses with each other. In each of these apparatuses, adder terminals were provided in input stages of the voltage current converters 10a to 10d and stepped voltages were applied to these terminals to apply such a disturbance as to cause stepped twist motion of the vibration elimination table 8. The control apparatus shown in FIG. 2 showed such control characteristics that significant excitations appear not only in the twist error signal $z\theta\phi$ but also in the error signals of other motion modes, in response to the disturbance which caused twisting motion. In contrast, in the case of the control apparatus shown in FIG. 1, error signals of operation modes other than the twist error signal $z\theta\phi$ showed no excitation. In addition, the excitation amplitude of the twist error signal $z\theta\phi$ itself is significantly smaller than that in the control apparatus shown in FIG. 2, and the setting time is also shortened as compared with that offered by the apparatus shown in FIG. 2. Thus, the described embodiment of the control apparatus for pneumatic vertical vibration elimination table can effectively suppress flexible twist motion mode. The control apparatus of this embodiment, therefore, allows the use of a vibration elimination table having reduced rigidity.

Although not illustrated, comparisons between these two types of apparatuses were conducted by applying to the vibration elimination table 8 disturbances for causing translational motion and two types of rotations of the table 8, in the same way as that used in the experiment described above in connection with FIG. 4.

Needless to say, the embodiment of the present invention provided much superior convergence of motion mode error signals than the known control apparatus.

Although the invention has been described through illustration of a preferred embodiment, it is to be understood that the described embodiment is only illustrative and various changes or modifications may be imparted thereto. In the illustrated embodiment, the control apparatus is used in combination with a pneumatic vertical vibration elimination table which employ pneumatic springs as the actuators, so as to control not only rigid motion modes but also flexible motion mode. The invention, however, is not limited to the control of an active vibration elimination table using pneumatic springs as the actuators but also to control other types of vibration elimination tables such as an active vibration elimination tables which use voice coil motors as the actuator.

It is also to be noted that the control system used in the embodiment shown in FIG. 1, which is composed of analog computing circuits, may be partly or wholly replaced with digital computing means such as an electronic computer.

As has been described, according to the present invention, error signals are extracted not only for three rigid motion modes including one degree of freedom for translational motion and two degrees of freedom for rotations but also for flexible twist motion mode, as a result of computations which are performed based on position error signals derived from four positions. Optimum compensations are effected on the respective motion modes and the thus obtained compensated signals are again distributed to driving signals corresponding to drives of the respective actuators. It is therefore possible to apply effective controls on the respective motion modes independently. In the conventional control apparatus in which independent feedback system is used for each supporting leg structures, the control of posture of the vibration elimination table could not effectively be done due to the mutual influences of motions of four supporting leg structures. According to the invention, this problem is overcome by virtue of the above-described features.

Hitherto, the work for stably setting the vibration elimination table by four supporting leg structures was rendered difficult due to interference of effects of controls of the four supporting leg structures. Namely, when an adjustment such as setting of a reference position signal, adjustment of a control loop gain or adjustment of a time constant of the PI compensator is conducted for one of the supporting leg structures, the effect of the adjustment inevitably influences the motions of other supporting leg structures. Consequently, complicated and troublesome work has been necessary to stably set the vibration elimination table 8.

According to the invention, however, the adjustment work for stabilizing the motion of the vibration elimination table 8 can be conducted on the basis of the synthetic motion of the whole vibration elimination table apparatus, without relying upon independent adjustment of local portions of the table. Consequently, the adjustment work is remarkably facilitated as compared with the conventional control technique.

Conventionally, a vibration elimination table is required to have a very high level of rigidity in order to carry heavy instruments or apparatuses, resulting in a tremendous increase in the weight of the whole table apparatus including the instruments or apparatuses carried thereon. Consequently, transportation and installation of vibration elimination table could not be done easily and the site of installation required special construction work such as reinforcement of the floor for bearing the large weights of the entire vibration elimination table apparatus.

According to the invention, however, it is possible to effectively suppress the motion of the table in a twist mode, thus reducing the strictness of requiring that the vibration elimination table be very rigid. Consequently, the overall weight of the entire vibration elimination table apparatus can be reduced, thus facilitating transportation and installation, while eliminating the necessity for stiffening the floor of the house as the installation site, thus contributing to a reduction in the total cost.

Obviously, any structure can more or less have a flexible motion mode such as twist motion, however it may be rigid. Thus, the present invention can appreciably improve the precision of posture control even when applied to an existing highly rigid vibration elimination table.

Although a specific embodiment of the present invention has been described above in detail, it will be understood that this description is merely for purposes of illustration. Various modifications of and equivalent structures corresponding to the disclosed aspects of the preferred embodiment in addition to those described above may be made by those skilled in the art without departing from the spirit of the present invention which is defined in the following claims, the scope of which is to be accorded the broadest interpretation so as to encompass such modifications and equivalent structures.

What is claimed is:

1. A control apparatus for controlling a vertical vibration elimination table, comprising:

four supporting leg structures arranged at four corners of the vibration elimination table, with each said supporting leg structure including a position sensor for producing a position signal indicative of a vertical position of the vibration elimination table, an acceleration sensor for producing an acceleration signal indicative of the vertical acceleration of the vibration elimination table and an actuator for vertically supporting the vibration elimination table; and a feedback system receiving the position signals and the acceleration signals, said feedback system feeding back the position signals to form drive signals for driving the actuators and for feeding back the acceleration signals to the drive signals, wherein said feedback system comprises:

a 4-degree-of-freedom motion mode extraction circuit which extracts motion mode error signals of motion modes for four degrees of freedom of the table, including one degree of freedom for translational motion, two degrees of freedom for rotational motion and one degree of freedom for twist motion, based upon error signals determined as deviations of the position signals produced by said position sensors and corresponding reference position signals;

compensation means for producing compensated motion mode signals by compensating the respective motion mode error signals such that each motion mode error signal is compensated independently of other motion mode error signals; and a motion mode distribution circuit for producing drive signals corresponding to the respective actuators based on the compensated motion mode signals and for delivering the driving signals to said respective actuators.

2. A control apparatus according to claim 1, wherein said feedback system further comprises comparator means for comparing the position signals produced by said position sensors with the corresponding reference position signals.

3. A control apparatus for a vertical vibration elimination table apparatus supported by actuators at four portions thereof, with the actuators being operable in response to signals which are fed back thereto and which are indicative of vertical positions and vertical accelerations of the four portions of the table, the control apparatus comprising:

a 4-degree-of-freedom motion mode extraction circuit for extracting motion mode error signals of four degrees of freedom of the table, including one degree of freedom for translational motion, two degrees of freedom for rotational motion and one degree of freedom for twist motion;

compensation means for producing compensated motion mode signals by compensating the respective motion mode error signals such that each motion mode error signal is compensated independently of the other motion mode error signals;

motion mode distribution circuit means for producing drive signals based on said compensated motion signals and delivering said drive signals to the respective actuators; and control means for driving the actuators based on the drive signals supplied by said motion mode distribution circuit.

4. A control apparatus as set forth in claim 3, wherein said compensation means includes a plurality of compensators, with each compensator compensating for one motion mode error signal independently of the other motion mode error signals.

5. A control apparatus according to claim 3, further comprising comparator means for comparing the position signals of the actuators with corresponding reference position signals and feeding the results to said motion mode extraction circuit.

6. A vibration elimination apparatus, comprising:

a base;

a plurality of actuator units supporting said base at different positions, each said actuator unit including an actuator for moving said base, a position sensor for measuring the position of said base and an acceleration sensor for measuring the acceleration of said base; and control means for controlling said actuators based on outputs of said position sensors and said acceleration sensors, said control means including a motion mode extraction circuit which extracts, based on deviations of the outputs from said respective position sensors from corresponding different positions, error signals of motion modes of four degrees of freedom of said base, including one degree of freedom for translational motion, two degrees of freedom for rotational motion and one degree of freedom for twist motion, wherein said control means controls said actuators based on independent motion mode error signals.

7. An apparatus according to claim 6, wherein there are four actuator units.

8. An apparatus according to claim 7, wherein said actuator includes a gaseous phase spring and a servo valve for controlling the supply and discharge of gas to and from said Gaseous phase spring.

9. An apparatus according to claim 6, further including an X-Y table carried on said base and capable of performing a step and repeat operation.

10. A vibration elimination apparatus as set forth in claim 6, wherein said control means includes a plurality of compensators for producing compensated motion mode signals by compensating the respective motion mode error signal such that each motion mode error signal is compensated independently of the other motion mode error signals.

11. A vibration elimination apparatus as set forth in claim 6, wherein said control means includes comparator means for comparing position signals from each respective position sensor with corresponding reference signals and outputting any deviation therebetween to said motion mode extraction circuit.

* * * * *

UNITED STATES PATENT AND TRADEMARK OFFICE
CERTIFICATE OF CORRECTION

PATENT NO. :   5,478,043
DATED      :   December 26, 1995
INVENTOR(S):   Wakui

It is certified that error appears in the above-indentified patent and that said Letters Patent is hereby corrected as shown below:

COLUMN 2:

Line 5, trough" should read --through--.

COLUMN 5:

Line 19, "assessed" should read --possessed--.
   Line 24, "to" should read --the--.

COLUMN 7:

Line 19, "structures," should read --structure,--.

COLUMN 10:

Line 14, "Gaseous" should read --gaseous--.

Signed and Sealed this

Second Day of July, 1996

Attest:

BRUCE LEHMAN

*Attesting Officer*        *Commissioner of Patents and Trademarks*